(12) United States Patent
Dengler

(10) Patent No.: US 9,421,404 B2
(45) Date of Patent: Aug. 23, 2016

(54) FIRE PROTECTION APPARATUS

(71) Applicant: SIEMENS AKTIENGESELLSCHAFT, Munich (DE)

(72) Inventor: Georg Dengler, Hirschaid (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 14/382,059

(22) PCT Filed: Feb. 25, 2013

(86) PCT No.: PCT/EP2013/053652
§ 371 (c)(1),
(2) Date: Aug. 29, 2014

(87) PCT Pub. No.: WO2013/127714
PCT Pub. Date: Sep. 6, 2013

(65) Prior Publication Data
US 2015/0014001 A1    Jan. 15, 2015

(30) Foreign Application Priority Data

Feb. 29, 2012  (DE) .......................... 10 2012 203 146

(51) Int. Cl.
| H01B 7/00 | (2006.01) |
|---|---|
| A62C 3/16 | (2006.01) |
| H02G 3/04 | (2006.01) |
| H02G 3/22 | (2006.01) |

(52) U.S. Cl.
CPC .............. *A62C 3/16* (2013.01); *H02G 3/0412* (2013.01); *H02G 3/22* (2013.01)

(58) Field of Classification Search
USPC ........ 174/74 R, 78, 79, 77 R, 80, 84 R, 88 R, 174/88 S
See application file for complete search history.

(56) References Cited

U.S. PATENT DOCUMENTS

| 5,272,278 | A | * | 12/1993 | Wuertz | H02G 3/185 174/484 |
|---|---|---|---|---|---|
| 5,664,810 | A | | 9/1997 | Zielinski | |
| 5,750,927 | A | * | 5/1998 | Baltazar | A62C 3/16 169/48 |
| 5,763,826 | A | * | 6/1998 | Castellani | H02G 3/185 174/487 |
| 5,811,731 | A | * | 9/1998 | Jacques | A62C 3/16 174/68.3 |
| 5,814,764 | A | * | 9/1998 | Kohaut | H02G 3/22 174/360 |
| 6,426,463 | B2 | | 7/2002 | Muenzenberger et al. | |
| 6,852,412 | B2 | * | 2/2005 | Keogh | B32B 1/00 174/113 R |

(Continued)

FOREIGN PATENT DOCUMENTS

| CN | 1150709 A | 5/1997 |
|---|---|---|
| DE | 19960485 A1 | 6/2001 |

(Continued)

*Primary Examiner* — William H Mayo, III
(74) *Attorney, Agent, or Firm* — Laurence Greenberg; Werner Stemer; Ralph Locher

(57) ABSTRACT

A fire protection device is for a cable bushing that leads a cable unit from a fire-risk area to an area to be protected against fire. The fire protection device has a fire protector that is provided for protection against the spread of fire into the space to be protected through the cable bushing. The fire protector is configured as an assembly component.

6 Claims, 2 Drawing Sheets

(56) References Cited

U.S. PATENT DOCUMENTS

| | | |
|---|---|---|
| 6,963,031 B2 | 11/2005 | Gladfelter et al. |
| 2002/0032996 A1 | 3/2002 | Cornwall |
| 2005/0045356 A1* | 3/2005 | Valenziano ............ H02G 3/185 174/483 |
| 2006/0000630 A1* | 1/2006 | Hemingway ............ H02G 3/22 174/58 |
| 2006/0060369 A1* | 3/2006 | Hemingway ............ A62C 3/16 174/58 |
| 2006/0102369 A1* | 5/2006 | Milani ...................... E04B 5/48 174/481 |
| 2008/0053679 A1* | 3/2008 | Galasso ................. H02G 3/185 174/67 |
| 2008/0087462 A1* | 4/2008 | Jolly ...................... H02G 3/185 174/483 |
| 2008/0217043 A1* | 9/2008 | Schoke ................ H02G 3/0412 174/110 R |

FOREIGN PATENT DOCUMENTS

| | | | |
|---|---|---|---|
| DE | 102005060013 A1 | 1/2007 | |
| EP | 2154762 A2 | 2/2010 | |
| EP | 2273637 A2 | 1/2011 | |
| EP | 1962398 B1 | 12/2011 | |
| GB | 2 147 155 A * | 9/1983 | ............ H02G 15/00 |
| GB | 2147155 A | 5/1985 | |
| RU | 2319056 C2 | 3/2008 | |

\* cited by examiner

FIRE PROTECTION APPARATUS

BACKGROUND OF THE INVENTION

Field of the Invention

The invention relates to a fire protection apparatus for a cable bushing leading a cable unit from a space at risk of fire to a space to be protected against fire, having a fire protection means, which is provided for protecting against the spread of a fire into the space to be protected through the cable bushing, wherein the fire protection means has a structural unit made of an intumescent material and a main body, to which the structural unit is fastened.

During the spread of a fire from a vulnerable space equipped with electrical appliances, cable bushings, which form interfaces between the vulnerable space and a space to be protected, represent weak points critical to safety without special measures. It is difficult to avoid the fire spreading through these unprotected points, since they do not satisfy the requirement of complete sealing without protective measures.

EP 2 154 762 A2 discloses a fire protection apparatus in the form of a special fire protection box which is filled with intumescent material and which is fitted to a partition wall between a space at risk of fire and a space to be protected. This as a complete solution is unfavorable for retrofitting a cable interface provided with standard bushings, since these have to be replaced completely by a fire protection box and the partition wall has to be adapted.

It has furthermore already been proposed to fit an existing cable unit with a fire-inhibiting material, which is cast or foamed around the cable unit in the region of the cable bushing. Although this allows for the retrofitting of an existing cable bushing, it makes it harder to subsequently pull cable lines through the cable run.

EP 2 273 637 A2 moreover discloses a cable bushing which consists of an intumescent material or is coated with such a material.

EP 1 962 398 B1 furthermore discloses a fire protection means for a cable bushing which has an insert made of an intumescent material, which is pushed onto a cable run through the cable bushing, and a compression element, which presses the insert onto the cable.

BRIEF SUMMARY OF THE INVENTION

The invention is based on the object of providing a fire protection apparatus which affords a high flexibility in the use of cable bushings and upon a subsequent change in the cable installation.

To this end, it is proposed that the fire protection means is in the form of an assembly component, which is coupled to the cable bushing during assembly. The proposed embodiment of the fire protection means makes it possible to achieve particularly simple retrofitting of a cable interface provided with an existing cable bushing, it advantageously not being necessary for the cable bushing to be adapted for this operation. The proposed solution furthermore affords the advantage that subsequent work on the cable unit can easily be carried out, since the fire protection means as an assembly component can be removed from the cable interface by simple dismantling at any time as required.

In this context, an "assembly component" is to be understood to mean in particular a structural unit which is prefabricated at least in terms of its shape and its dimension and which is assembled by producing a mechanical connection to a further component. In contrast to a fire protection means made of a cast and/or foam material, which assumes its shape only when fitted to the cable unit, the shape of the assembly component is determined during its production or—in other words—the assembly component is assembled or fitted without further intrinsic chemical or physical conversion. As a result, an assembly component can advantageously be removed from the surroundings of the cable unit without thereby being destroyed. This makes it possible to reuse the fire protection means after the adaptation of a cable installation. The fire protection means as a prefabricated assembly component has the main body and the structural unit, fastened thereto, made of an intumescent material, and therefore it can be assembled on or coupled to the cable bushing in a simple manner—preferably in one assembly step. In comparison to a solution in which an intumescent insert is fitted to a cable unit and then fixed with the aid of a fastening element, the number of loose parts and the assembly outlay can be reduced. Moreover, the presence of a cable unit is not absolutely necessary for the assembly of the proposed fire protection means, and therefore the fire protection means or assembly component can be coupled to the cable bushing before cables are run through the cable bushing.

When the fire protection means is assembled, it is advantageously coupled to the cable bushing, as a result of which it is possible to achieve advantageous interaction between the fire protection means and the cable bushing. In particular, gaps between the fire protection means and the cable bushing, through which the fire can penetrate without special protection, can be avoided to the greatest possible extent.

A "cable bushing" is to be understood to mean in particular an assembly component which has at least one space provided for the passage of the cable unit. It is preferable that the cable bushing forms a cable duct for the cable unit, in which said cable unit is advantageously completely surrounded by the cable bushing perpendicular to the direction of extent of the cable unit. The cable bushing can have various functions and can be in the form, for example, of a bulkhead fitting, a cable gland or a cable conduit fitting. It is preferable that the cable bushing is arranged on a separating apparatus, which forms at least one surface which separates the space to be protected from the space at risk of fire. In particular, the cable bushing is fastened to the separating apparatus. The cable bushing is preferably arranged in the region of an opening cut out of the separating apparatus and can advantageously penetrate into said opening, the dimension of the cable bushing and the dimension of the opening advantageously being matched to one another. The cable bushing is expediently located at least partially in the space to be protected, it being possible for an end region of the cable bushing to be located in the vulnerable space.

The fire protection means coupled to the cable bushing can be arranged in the space at risk of fire or in the space to be protected.

The "cable unit" can have at least one cable or a cable bundle, where "cable" is to be understood to mean a unit made up of at least one electrical conductor and preferably a protective sheath surrounding the latter. During assembly of the cable unit, it is expediently run through the cable bushing, as a result of which the cable unit, when laid, advantageously runs uninterrupted through the cable bushing.

An "intumescent" material is to be understood to mean in particular a material which is intended to increase in volume under the action of heat and—e.g. by foaming—to form an insulating layer which can prevent the supply of oxygen into the vulnerable space.

Furthermore, it is proposed that the fire protection means together with the cable bushing forms a cable duct for the cable unit, as a result of which it is possible to achieve a particularly simple cable run of the cable unit in the region of the cable interface. The cable unit can be laid here through the cable bushing and the fire protection means with little effort. In particular, the cable unit can run uninterrupted through the cable bushing and the fire protection means. It is particularly preferable that the cable duct formed by the cable bushing and the fire protection means has a uniform direction of extent, as a result of which the cable duct advantageously has a rectilinear orientation over the entire extent thereof.

In this context, a "cable duct" is to be understood to mean in particular a section which is provided for the extent or the run of a cable unit and extends in particular within a structural unit comprising the section.

Furthermore, fire penetration points between the cable bushing and the fire protection means can be avoided in a particularly efficient manner if—when the fire protection means is coupled to the cable bushing—the fire protection means and the cable bushing overlap in a direction oriented perpendicular to the direction of extent of the cable unit. If the fire protection means and the cable bushing are coupled to one another when assembled, in this context it is possible for the fire protection means to be assembled in a particularly simple manner by being pushed or screwed directly onto the cable bushing or by being pushed or screwed into the cable bushing.

In an alternative embodiment, the fire protection means and the cable bushing can be flanged to one another when assembled.

If the cable bushing is fastened to a separating apparatus which separates the space to be protected from the space at risk of fire, fire penetration points between the fire protection means and the separating apparatus can advantageously be avoided by virtue of the fact that the fire protection means rests on the separating apparatus.

In order to prevent the penetration of the fire through intermediate spaces formed in the cable unit to the greatest possible extent, it is proposed in a further embodiment variant of the invention that, when the structural unit is installed, the cable unit is run through it. The structural unit in this respect advantageously forms a cable duct, through which the cable unit is run. The structural unit preferably has an annular configuration, the cable unit being completely surrounded by the structural unit in the radial direction of the ring.

It is possible to achieve a structurally simple and compact embodiment of the fire protection means if the main body is in the form of a hollow body which comprises an inner space which is provided for the passage of the cable unit and in which is arranged the structural unit. Owing to the arrangement of the structural unit within the main body, the intumescent material can fill the inner space of the main body to the greatest extent possible under the action of heat, it being possible to achieve a particularly high level of protection against the spread of a fire. If the fire protection means together with the cable bushing forms a cable duct for the cable unit, the intumescent material can expand into the part of the cable duct which is formed by the cable bushing. With this embodiment, it is advantageously possible to achieve a high level of protection against the spread of a fire into the space to be protected, in particular even if the fire protection means is arranged in the space to be protected.

A structurally simple embodiment of the fire protection means which saves material can moreover be achieved if the fire protection means has an annular form. A particularly high flexibility in the use of the fire protection means can furthermore be achieved if the fire protection means has at least one coupling point, at which at least two partial regions of the fire protection means are coupled to one another, when the latter is assembled, around the cable unit in the laid state thereof. In this respect, the fire protection means can have at least two parts which are fastened to one another, during assembly, around the cable unit. As an alternative, the fire protection means can be produced from a flexible material, in which case it is advantageous that merely one coupling point is required.

The invention is particularly suitable for use in conjunction with electrical devices installed on board a vehicle. In view of their restricted volume, the spaces which are provided in particular for accommodating passengers or the vehicle driver have to be protected against the spread of a fire in accordance with particularly strict safety requirements. This applies in particular to rail vehicles, in which an immediate stop in the event of a fire breaking out is not permissible in certain circumstances—such as when travelling through a tunnel section. The space which is to be protected by means of the fire protection apparatus, which is in the form of a rail vehicle fire protection apparatus, corresponds to a passenger compartment and/or to a driver's cab.

BRIEF DESCRIPTION OF THE SEVERAL VIEWS OF THE DRAWING

Exemplary embodiments of the invention will be explained with reference to the drawings, in which.

DESCRIPTION OF THE INVENTION

Figure 1:
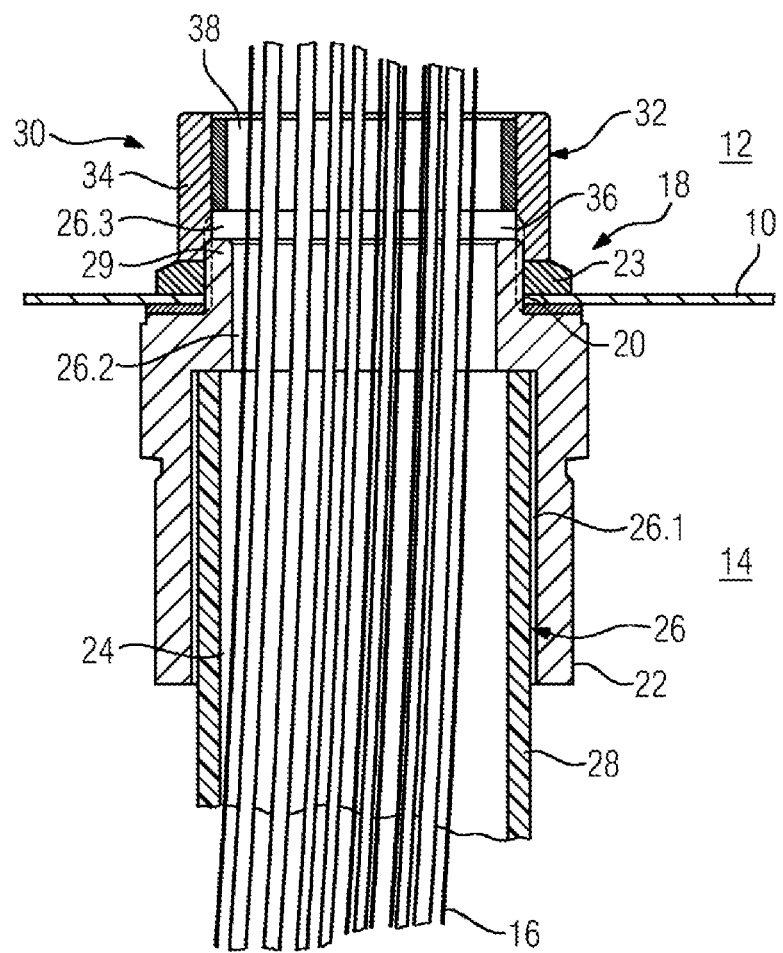
FIG. 1: shows a fire protection apparatus for a cable interface of a partition wall separating a space at risk of fire from a space to be protected, in a sectional view.

FIG. 1 shows a separating apparatus 10 in the form of a partition wall in a sectional view. The separating apparatus 10 is provided for separating a space 12 at risk of fire (shown at the top) from a space 14 to be protected from fire (shown at the bottom). Electrical appliances (not shown) which are supplied with electrical energy by means of a cable unit 16 are arranged in the space 12. The space 12 can correspond, for example, to the inner space of an electrical box or an engine compartment, in which a fire can potentially be triggered on account of the malfunction of an electrical device. The separating apparatus 10 preferably corresponds to a housing wall of a housing which surrounds the space 12.

The cable unit 16, which in the exemplary embodiment under consideration corresponds to a cable bundle, runs out of the space 12 through a cable interface 18 of the separating apparatus 10 into the space 14. The cable interface 18 has an opening 20 which has been cut out in the separating apparatus 10 and through which the cable unit 16 is run into the space 14. In this case, the cable unit 16 runs in particular uninterrupted from the space 12 through the opening 20 into the space 14.

The cable interface 18 furthermore has a cable bushing 22, which is arranged on that side of the separating apparatus 10 which faces toward the space 14. The cable bushing 22 corresponds to an assembly component, which is fitted to the separating apparatus 10 during assembly and can be separated therefrom again in a non-destructive manner as required.

The cable bushing 22 is fastened to the separating apparatus 10 by means of a fastening part 23, which rests against that side of the separating apparatus 10 which faces toward the vulnerable space 12 and which is in the form in particular of an annular hexagon nut. The cable bushing 22 is in the form of a sleeve, which surrounds a hollow space 24 and forms a cable duct 26 for the cable unit 16. The cable unit 16 is protected in the space 14 by means of a cable protection apparatus 28, which is in the form in particular of a plastic tube. The cable bushing 22 is in the form of a cable conduit fitting and in this way is adapted for coupling to the cable protection apparatus 28 which is inserted into the hollow space 24.

The cable duct 26 has a first partial region 26.1, which serves for the insertion of the cable protection apparatus 28 and extends from an end of the cable bushing 22 remote from the separating apparatus 10 in the direction of the separating apparatus 10. The first partial region 26.1 is adjoined by a second partial region 26.2 of the cable duct 26, which serves for running the cable unit 16 through the opening 20 in the separating apparatus 10. The second partial region 26.2 adjoins the end of the cable protection apparatus 28.

The cable bushing 22, in particular the second partial region 26.2 of the cable duct 26, extends through the opening 20 into the vulnerable space 12, such that one end 29 of the cable bushing and therefore part of the cable duct 26 are arranged in the space 12. The fastening part 23 engages around the end 29 of the cable bushing 22 in an annular manner.

The cable interface 18 is furthermore provided with a fire protection apparatus 30 having a fire protection means 32 which is provided for protecting the cable interface 18 against the spread of a fire triggered in the space 12 into the space 14 to be protected. Said fire protection means is in the form of an assembly component, which is assembled in the region of the cable interface 18 and if required can be separated therefrom again in a non-destructive manner. During assembly, the fire protection means 32 is coupled to the cable bushing 22, it being fastened in particular to the end 29 of the cable bushing 22. In particular, the fire protection means 32 is pushed directly onto the cable bushing 22. As an alternative, it can be screwed to the cable bushing 22. The fire protection means 32 is arranged in the space 12 at risk of fire, it being coupled—as already described above—to the end 29 of the cable bushing 22 located in the space 12. In the region in which the cable bushing 22 and the fire protection means 32 are coupled, the end 29 and the fire protection means 32 overlap in a direction perpendicular to the main direction of extent of the cable duct 26 or parallel to the surface of the separating apparatus 10 in the region of the cable interface 18, i.e. perpendicular to the direction of extent of the cable unit 16.

The fire protection means 32 has a main body 34, which is in the form of an annular sleeve. The hollow main body 34 in this respect comprises an inner space 36, via which the cable unit 16 is run from the space 12 into the cable bushing 22. The fire protection means 32 in this way forms a further partial region 26.3 of the cable duct 26, which adjoins the partial region 26.2. Accordingly, the fire protection means 32 and the cable bushing 22 together form the continuous cable duct 26, by means of which the cable unit 16 is run from the space 12 into the space 14.

Furthermore, the fire protection means 32 has a structural unit 38 produced from an intumescent material. This structural unit 38 has an annular form and surrounds the cable unit 16. The cable unit 16 is in this respect run through the structural unit 38. In the embodiment shown, the structural unit 38 is arranged in the inner space 36 of the main body 34 and is completely surrounded thereby in the radial direction. The structural unit 38 therefore corresponds to an insert which is inserted into the main body 34 during the production of the fire protection means 32.

In the embodiment shown, the cable bushing 22 corresponds to a component which is used as standard in combination with the separating apparatus 10. In the exemplary embodiment under consideration, the cable bushing 22 is in the form of a cable conduit fitting, where further embodiments, for example as a bulkhead fitting, cable gland, etc., are likewise conceivable.

The fire protection means 32 makes it possible to achieve an advantageous protection of the cable interface 18, which is provided with an existing cable bushing 22, without structural adaptation of the cable bushing 22 being required. With the proposed design of the fire protection means 32, the cable bushing 22 can be retrofitted simply by the fire protection means 32 being coupled thereto. In the exemplary embodiment under consideration, the fire protection means 32 can simply be pushed onto the existing cable bushing 22, or it can be screwed onto it.

After the fire protection means 32 has been fitted to the cable bushing 22, the cable unit 16 can be run through the cable duct 26 which is formed.

If a fire is triggered in the vulnerable space 12, the structural unit 38 is foamed, as a result of which a burnthrough resistance is generated directly in the cable duct 26. Spreading of the fire through the cable duct 26 of the cable bushing 22 can thereby be avoided.

Figure 2:
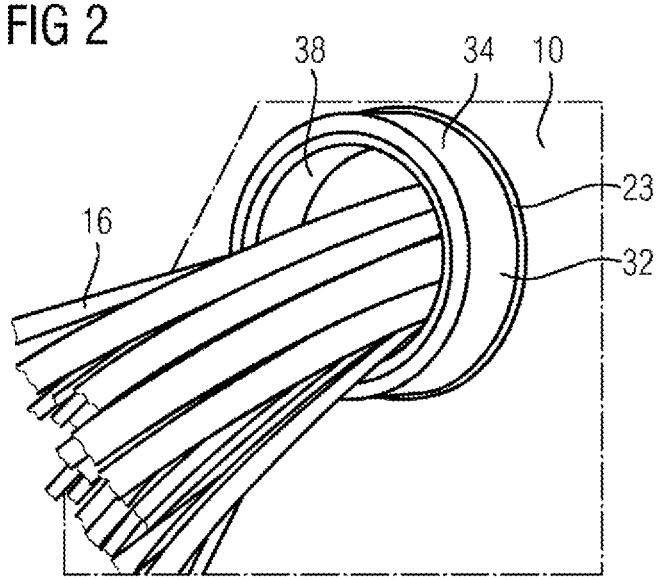
FIG. 2: shows a fire protection means of the fire protection apparatus on that side of the partition wall which is at risk of fire, in a perspective view.

In the embodiment considered above, it has been assumed that the space 12 corresponds to a space at risk of fire and the space 14 is the space to be protected, and therefore the fire protection means 32 is located in the vulnerable space 12. The fire protection means 32 can also serve to prevent the spread of a fire triggered in the space 14 into the space 12. In this case, the space 14 is considered to be the space at risk of fire and the space 12 is considered to be the space to be protected, with the fire protection means 32 being arranged in the space 12 to be protected. FIG. 2 shows the arrangement of the fire protection means 32 on the separating apparatus 10 in a perspective view. The annular structural unit 38 made of an intumescent material is arranged in the inner space 36 of the main body 34 as an insert piece and completely surrounds the cable unit 16 perpendicular to the direction of extent thereof.

Figure 3:
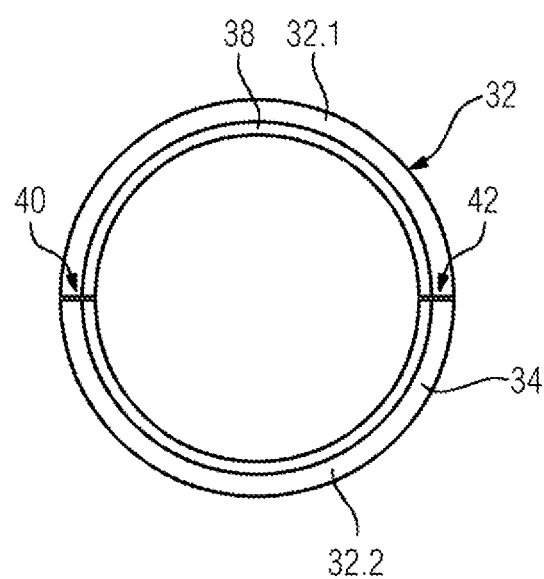
FIG. 3: shows the fire protection means shown in FIG. 2 in an alternative embodiment.

FIG. 3 shows a variant of the fire protection means 32 in a front view. In this embodiment, the fire protection means 32 has two partial regions 32.1 and 32.2 in the form of two parts, which are coupled to one another at coupling points 40, 42 during assembly in the region of the separating apparatus 10. They can be joined to one another by means of an adhesive, soldered, screwed and/or flange connection. In this embodiment, it is possible to easily retrofit the cable interface 18 with the fire protection means 32, without the cable unit 16 having to be removed.

The invention claimed is:

1. A fire protection apparatus for a cable interface of a separating apparatus for separating a space at risk of fire from a space to be protected from the fire, the cable interface having an opening being cut out in the separating apparatus and a cable bushing leading a cable unit from the space at risk of fire to the space to be protected against fire, the fire protection apparatus comprising:

a fire protection device for protecting against a spread of the fire into the space to be protected through the cable bushing, said fire protection device having a structural unit made of an intumescent material and a main body, said structural unit fastened to said main body, said fire protection device together with the cable bushing forming a cable duct for the cable unit and said fire protection device being a prefabricated assembly component which is mountable in a region of the cable interface, wherein a mounting of the prefabricated assembly component in the region of the cable interface includes coupling the prefabricated assembly component to the cable bushing.

2. The fire protection apparatus according to claim 1, wherein when said fire protection device is coupled to the cable bushing, said fire protection device and the cable bushing overlap in a direction oriented perpendicular to a direction of extent of the cable unit.

3. The fire protection apparatus according to claim 1, wherein when said structural unit is installed, the cable unit runs through said structural unit.

4. The fire protection apparatus according to claim 1, wherein said main body is a hollow body having an inner space provided for a passage of the cable unit and in said inner space said structural unit is disposed.

5. The fire protection apparatus according to claim 1, wherein said fire protection device has an annular form.

6. The fire protection apparatus according to claim 1, wherein said fire protection device has at least two partial regions and at least one coupling point, at said coupling point said at least two partial regions are coupled to one another when said fire protection device is assembled around the cable unit in a laid state of the cable unit.

* * * * *